US006993499B2

(12) United States Patent
Gagnon et al.

(10) Patent No.: US 6,993,499 B2
(45) Date of Patent: Jan. 31, 2006

(54) PAY-TV BILLING, SYSTEM ACTIVATION, AND E-COMMERCE USING A PAY-TV RECEIVER

(75) Inventors: Gregory J. Gagnon, Torrance, CA (US); Dennis R. Flaharty, Irvine, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 673 days.

(21) Appl. No.: 09/726,368

(22) Filed: Nov. 29, 2000

(65) Prior Publication Data

US 2002/0066103 A1 May 30, 2002

(51) Int. Cl.
G06F 17/60 (2006.01)
(52) U.S. Cl. .......................................... 705/26; 709/226
(58) Field of Classification Search .................. 705/26, 705/27, 24, 23, 42; 348/564; 709/228
See application file for complete search history.

(56) References Cited

U.S. PATENT DOCUMENTS

| 5,890,137 | A | * | 3/1999 | Koreeda ........................ 705/26 |
| 5,978,855 | A | * | 11/1999 | Metz et al. ................... 709/249 |
| 6,166,778 | A | * | 12/2000 | Yamamoto et al. ........... 725/40 |
| 6,275,268 | B1 | * | 8/2001 | Ellis et al. .................... 348/564 |
| 6,317,793 | B1 | * | 11/2001 | Toyosawa ..................... 709/228 |
| 6,363,364 | B1 | * | 3/2002 | Nel ................................ 705/26 |
| 2001/0014914 | A1 | * | 8/2001 | Muramatsu et al. .......... 709/224 |

FOREIGN PATENT DOCUMENTS

EP 0820206 A2 * 1/1998
WO 0820206 A2 * 1/1996

OTHER PUBLICATIONS

) "Comcast drops guide from 11 N.J. systems"; Anonymous; Multichannel News; New York; Oct. 30, 2000.*
Michael Robin et al., *Digital Television Fundamentals—Design And Installation Of Video And Audio Systems*, McGraw-Hill, Chapter 8, title page(s) and pp. 345-425.

* cited by examiner

*Primary Examiner*—Wynn W. Coggins
*Assistant Examiner*—R. E. Rhode, Jr.
(74) *Attorney, Agent, or Firm*—Georgann S. Grunebach

(57) ABSTRACT

One or more embodiments of the invention utilize a receiver as a terminal to enable commercial transactions to take place that may or may not be coupled with programming that is being broadcast and to provide customers with the option of having their pay-TV bills charged directly to a credit card. The pay-TV provider could allow the customer to activate their pay-TV systems, with the programming package of their choice, without having to call the pay-TV customer service. Utilizing the fact that receivers may have built in modems that are connected to phone lines, connections can be made through that phone line to initiate, transfer, and purchase services and merchandise. If the receiver can successfully establish a secure connection with the pay-TV service provider, vendor, or credit card provider and the billing information is successfully transferred, then the merchandise can be shipped or the appropriate signals can be sent to the receiver to activate the service that the customer has selected. This would have the potential of significantly reducing the number of customer service calls to the pay-TV service provider. Instead of the pay-TV service provider being responsible for billing, debt collection, etc. this now becomes the responsibility of the credit card company.

42 Claims, 6 Drawing Sheets

PAY-TV BILLING, SYSTEM ACTIVATION, AND E-COMMERCE USING A PAY-TV RECEIVER

BACKGROUND OF THE INVENTION

1. Field of the Invention.

The present invention relates generally to providing e-commerce and satellite subscription activation using a pay-TV receiver.

2. Description of the Related Art.

Television programs are distributed to viewers by a variety of broadcasting methods. These methods include traditional analog broadcast television Rational Television Systems Committee or "NTSC" standard), the digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

To view a television program, a customer may have to subscribe to a service package offered by a pay-TV service/ transmission provider such as a satellite transmitter (e.g., DIRECTV) or a cable company. Such a pay-TV service provider may require a user to utilize a set-top box, receiver, or integrated receiver decoder (IRD) that enables the descrambling or decryption of the transmission. The set-top box may be configured to allow the viewing of one or more particular channels, programs, etc. based on a customer's payment or subscription. Accordingly, when a customer subscribes to a service package, the pay-TV service provider enables the set-top box to allow the customer to view the transmissions in the selected package.

To initialize a subscription service, the customer must obtain a receiver. Once a receiver is purchased or provided to a customer, the customer must install or connect the receiver to a television, install the satellite dish (if necessary), and activate service with the transmission provider. To install and connect the receiver, the customer must call the pay-TV service provider to schedule a person to install and connect the relevant components. Further, to activate service, the customer must call the pay-TV service provider where a series of questions are answered and the customer selects a subscription package. Thereafter, the pay-TV service provider activates the service by communicating with the receiver and billing the customer monthly. Accordingly, service activation is a time consuming process for the customer and causes the pay-TV service provider to incur numerous expenses for the phone operators and technicians to activate the service.

Once service has been initiated, the customer must call the pay-TV service provider to alter or change the service. The prior art provides pay-per-view programs or channels wherein a customer may pay for a particular channel or program. A customer may select a particular pay-per-view program or channel using a remote control that communicates with the set-top box. Once the pay-pet-view program has been selected, information regarding the selected pay-pet view program is stored in the receiver until the receiver transmits the information to the pay-TV service provider through a modem attached to the receiver. Thereafter, the pay-TV service provider receives the information and bills the customer m a standard monthly bill. If the customer is delinquent, the pay-TV service provider may never be paid or may have to "float" the money until the customer pays. The pay-TV service provider must employ and utilize personnel to handle such bills and billing matters. Thus, the pay-TV service provider is incurring expenses on behalf of a customer.

In addition to merely watching a television program, customers may often view a commercial, infomercial, movie, television program, etc. and elect to purchase merchandise or services advertised or used therein. However, to complete such a purchase, a customer must find the appropriate vendor, contact the vendor, and place and pay for the order. An efficient mechanism for making purchases using a remote control and the television is not available.

What is needed is a method for efficiently and automatically activating a transmission service without the need to call the pay-TV service provider. Additionally, what is needed is an efficient and automatic method for payment by a customer for a subscription. Further, what is also needed is an efficient and automatic method for ordering and paying for merchandise and services utilizing components already available to the customer without the customer having to physically call a vendor.

SUMMARY OF THE INVENTION

A significant amount of the operating costs of a pay-TV service arises from billing infrastructure. One or more embodiments of the invention utilize an Integrated Receiver Decoder (IRD) as a terminal to enable commercial transactions to take place that may or may not be coupled with programming that is being broadcast and to provide customers with the option of having their pay-TV bills charged directly to a credit card.

In accordance with embodiments of the invention, the pay-TV service provider allows the customer to activate their pay-TV systems, with the programming package of their choice, without having to call the pay-TV customer service. Utilizing the fact that receivers have built in modems that are connected to phone lines, connections can be made through that phone line to initiate, transfer, and purchase services and merchandise.

Merchandise may be presented to the consumer in several different manners. For example, an item may be presented that relates to a program currently being watched by a consumer, such as the purchase of a particular item that is being featured in a program's story line. In another example, a customer may purchase a compact disc (CD) or album of an artist being featured on a music channel. A third type of item could be an on-air catalog of merchandise where a viewer can tune to a channel, and view the catalog in real time or at their convenience by downloading the catalog into the memory of the receiver.

A variety of services may be purchased in accordance with embodiments of the invention. For example, pay-TV billing information may be transferred to a credit card company. Such pay-TV billing information may include regular subscription fees, impulse pay-per-view (IPPV) purchases, and special purchase packages such as NFL Sunday Ticket. In addition, at the time of installation the customer could have the choice of utilizing the invention to activate their system, with the programming package of their choice, without having to call the pay-TV customer service.

If the receiver can successfully establish a secure connection with the pay-TV service provider, vendor, or credit card provider and the billing information is successfully transferred, then the merchandise can be shipped or the appropriate signals can be sent to the receiver to activate the service that the customer has selected. This would have the potential of significantly reducing the number of customer service calls to the pay-TV service provider.

Instead of the pay-TV service provider being responsible for billing, debt collection, etc. this now becomes the responsibility of the credit card company. The credit card company would benefit from the added volume of these transactions and any revenues that may be generated from interest payments from these accounts.

The customer would have the option of paying the entire pay-TV bill or only a portion of the bill. The portion not paid would simply roll over to the next month's bill.

The credit card company and the pay-TV service provider would then have some type of information sharing system where a delinquent customer or one that is not performing successful callbacks would have their pay-TV services suspended until the billing or callback issues are resolved.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Video Distribution System

Figure 1:
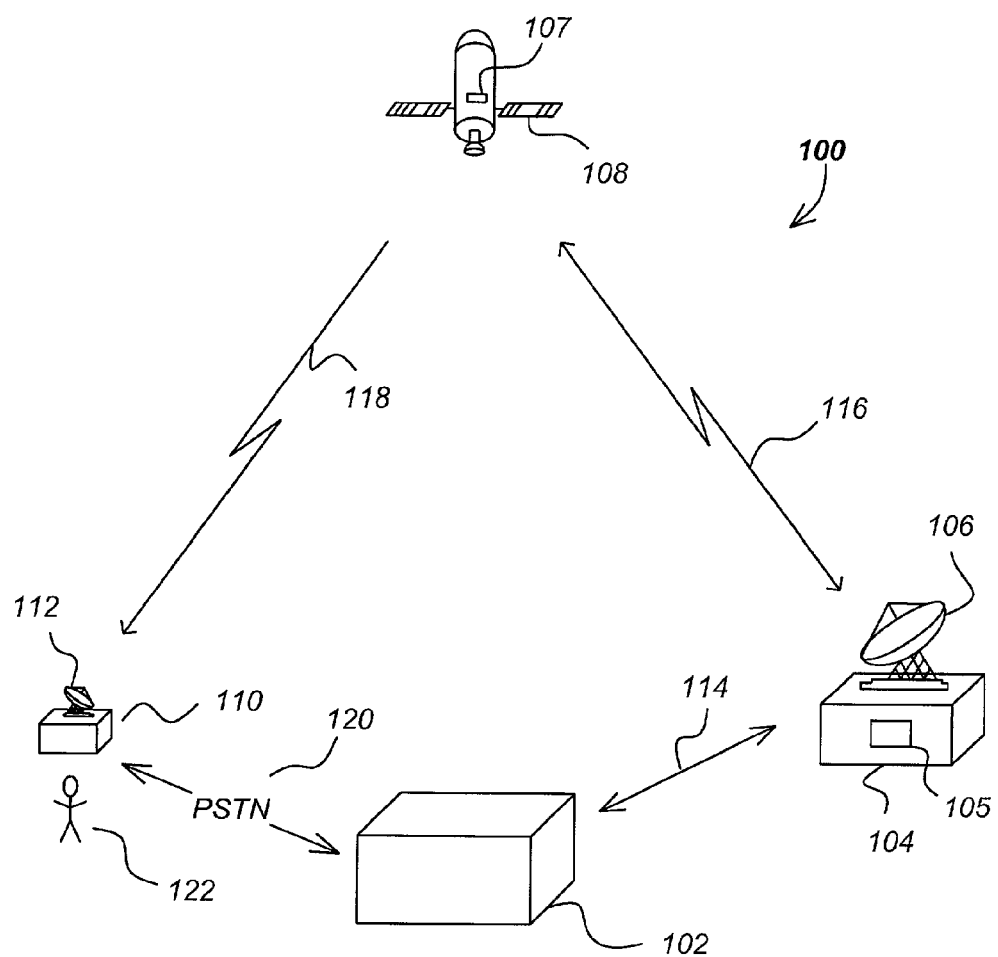
FIG. 1 is a diagram showing an overview of a video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the information delivered to the subscriber/customer 122 is video (and audio) material such as a movie, the foregoing method can be used to deliver program material comprising purely audio information or other data as well.

Uplink Configuration

Figure 2:
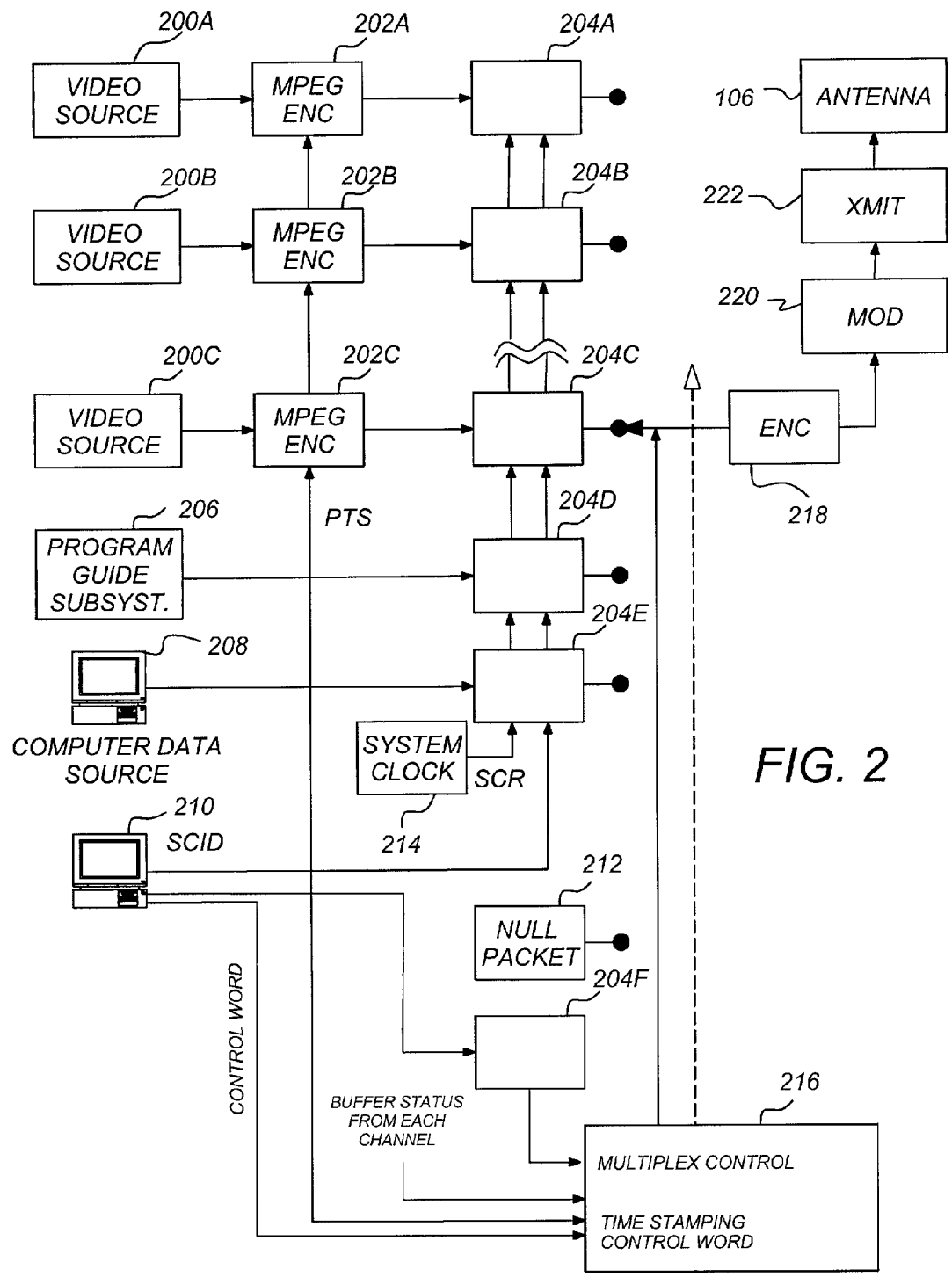
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206 and computer data information from a computer data source 208.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets (also referred to as signals) are then multiplexed into serial data and transmitted/broadcast.

Broadcast Data Stream Format and Protocol

Figure 3A:
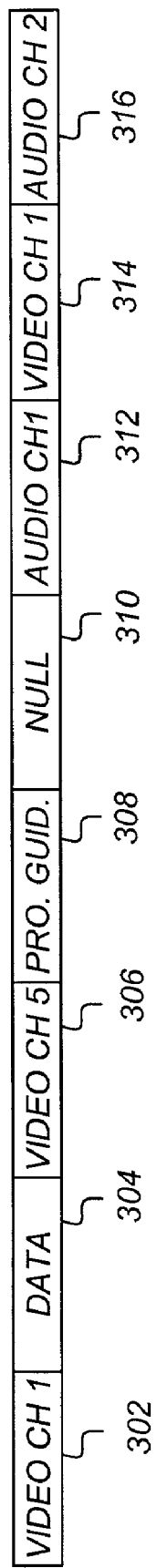
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver receives these signals, and using the SCID, reassembles the packets to regenerate the program material for each of the channels.

Figure 3B:
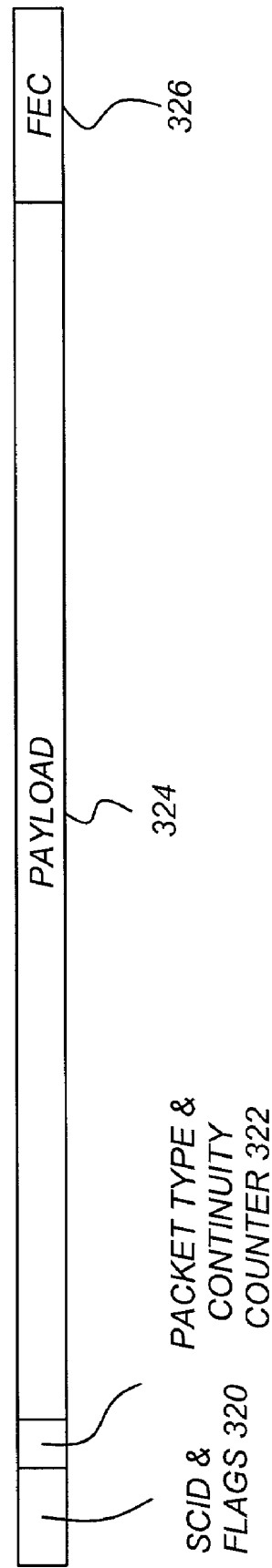
FIG. 3B is a diagram illustrating the structure of a data packet.

FIG. 3B is a diagram of a data packet. Each data packet (e.g. 302–316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by a video program source. The final packet segment 326 is data required to perform forward error correction.

Receiver

Figure 4:
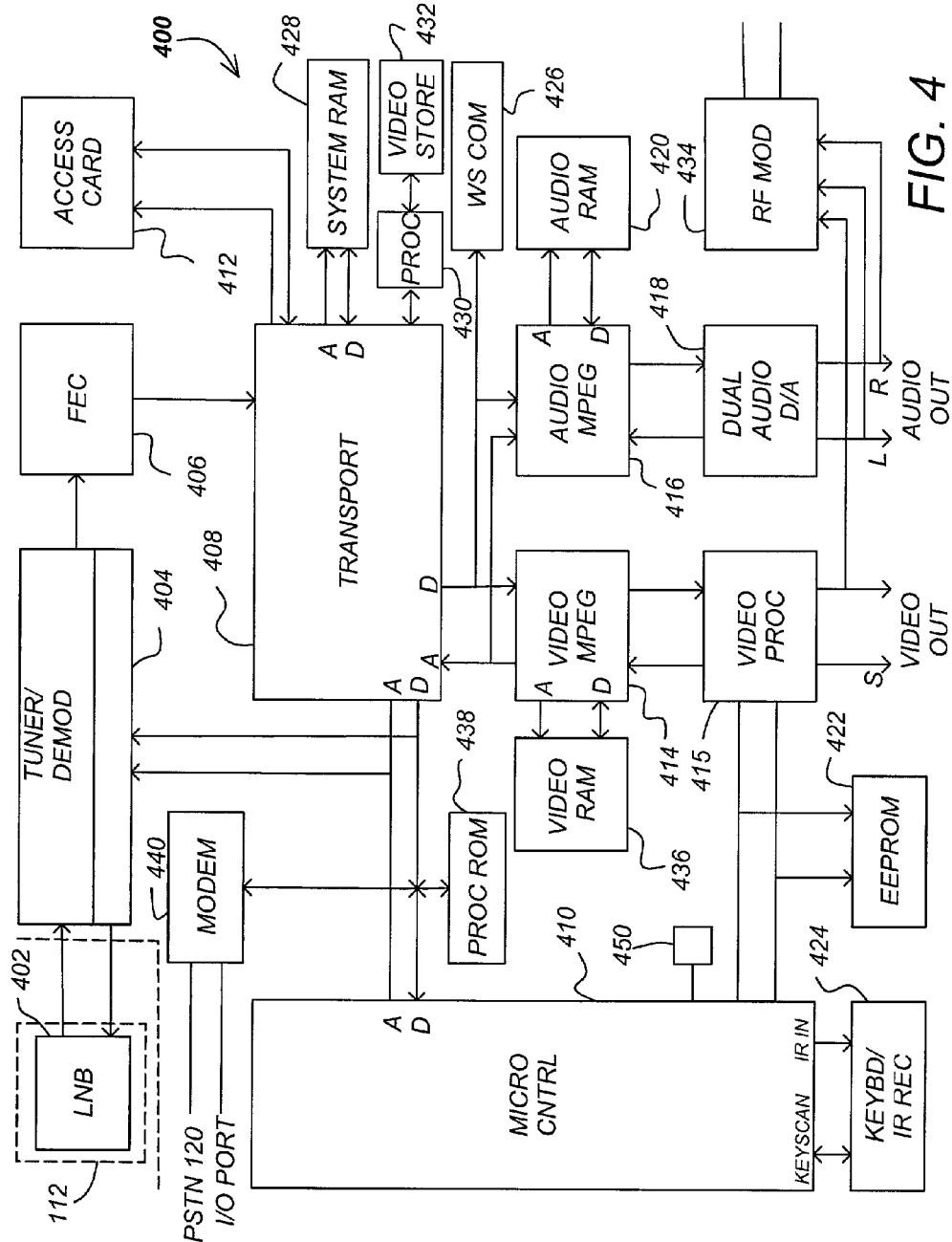
FIG. 4 is a block diagram of one embodiment of a receiver.

FIG. 4 is a block diagram of a receiver 400 (also hereinafter alternatively referred to as receiver 400). As described herein, receiver 400 may be an integrated receiver/decoder (IRD). Alternatively, the receiver 400 may not be integrated and may comprise a separate or non-integrated receiver and decoder.

The receiver 400 comprises an input mechanism such as tuner/demodulator 404 (or other mechanism capable of receiving input) communicatively coupled to an ODU 112 having one or more LNBs 402. The LNB 402 converts the broadcast signals (e.g., the 12.2- to 12.7 GHz downlink 118 signal) from the satellites 108 to a signal (e.g., a 950–1450 MHz signal) utilized by the receiver's 400 tuner/demodulator 404. The LNB 402 may provide either a dual or a single output. The single-output LNB 402 may have one or more RF connectors, while the dual output LNB 402 may have two RF output connectors and can be used to feed a second tuner 404, a second receiver 400 or some other form of distribution system.

The tuner/demodulator 404 isolates a single, digitally modulated 24 MHz transponder, and converts the modulated data to a digital data stream. The digital data stream is then supplied to a forward error correction (FEC) decoder 406. This allows the receiver 400 to reassemble the data transmitted by the uplink center 104 (which applied the forward error correction to the desired signal before transmission to the subscriber receiving station 110) verifying that the correct data signal was received and correcting errors, if any. The error-corrected data may be fed from the FEC decoder module 406 to the transport module 408 via an 8-bit parallel interface.

The transport module 408 performs many of the data processing functions performed by the receiver 400. The transport module 408 processes data received from the FEC decoder module 406 and provides the processed data to the video MPEG decoder 414 and the audio MPEG decoder 416. In one embodiment of the present invention, the transport module, video MPEG decoder and audio MPEG decoder are all implemented on integrated circuits. The transport module 408 also provides a passage for communications between the microcontroller 410 and the video and audio MPEG decoders 414, 416. The transport module also works with the conditional access module (CAM) 412 to determine whether the subscriber receiving station 110 is permitted to access certain program material. Data from the transport module can also be supplied to external communication module 426.

The CAM 412 functions in association with other elements to decode an encrypted signal from the transport module 408. The CAM 412 may also be used for tracking and billing these services. In one embodiment of the present invention, the CAM 412 is a smart card, having contacts cooperatively interacting with contacts in the receiver 400 to pass information. In order to implement the processing performed in the CAM 412, the receiver 400, and specifically the transport module 408 provides a clock signal to the CAM 412.

Video data is processed by the MPEG video decoder 414. Using the video random access memory (RAM) 436, the MPEG video decoder 414 decodes the compressed video data and sends it to an encoder or video processor 415, which converts the digital video information received from the video MPEG module 414 into an output signal usable by a display or other output device. By way of example, processor 415 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized.

Audio data is likewise decoded by the MPEG audio decoder 416. The decoded audio data may then be sent to a digital to analog (D/A) converter 418. In one embodiment of the present invention, the D/A converter 418 is a dual D/A converter, one for the right and left channels. If desired, additional channels can be added for use in surround sound processing or secondary audio programs (SAPs). In one embodiment of the invention, the dual D/A converter 418 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 410 receives and processes command signals from the remote control 424, a receiver 400 keyboard interface, and/or another input device. The microcontroller receives commands for performing its operations from a processor programming memory, which permanently stores such instructions for performing such commands. The processor programming memory may comprise a read only memory (ROM) 438, an electrically erasable programmable read only memory (EEPROM) 422 or, similar memory device. The microcontroller 410 also controls the other digital devices of the receiver 400 via address and data lines (denoted "A" and "D" respectively, in FIG. 4).

A communication mechanism (such as modem 440 or other mechanism capable of communicating) connects to the customer's phone line via the PSTN port 120. It calls, e.g. the program provider, and transmits the customer's purchase information for billing purposes, and/or other information. The communication mechanism 440 is controlled by the microprocessor 410. The communication mechanism 440 can output data to other I/O port types including standard parallel and serial computer I/O ports.

The present invention also comprises a local storage unit such as the video storage device 432 for storing video and/or audio data obtained from the transport module 408. Video storage device 432 can be a hard disk drive, a read/writable compact disc of DVD, a solid state RAM, or any other storage medium. In one embodiment of the present invention, the video storage device 432 is a hard disk drive with specialized parallel read/write capability so that data may be read from the video storage device 432 and written to the device 432 at the same time. To accomplish this feat, additional buffer memory accessible by the video storage 432 or its controller may be used. Optionally, a video storage processor 430 can be used to manage the storage and retrieval of the video data from the video storage device 432. The video storage processor 430 may also comprise memory for buffering data passing into and out of the video storage device 432. Alternatively or in combination with the foregoing, a plurality of video storage devices 432 can be used. Also alternatively or in combination with the foregoing, the microcontroller 410 can also perform the operations required to store and or retrieve video and other data in the video storage device 432.

The video processing module 415 output can be directly supplied as a video output to a presentation device such as a video, computer monitor, liquid crystal display (LCD), television, or other device capable of viewing the video output. In addition the video and/or audio outputs can be supplied to an RF modulator 434 to produce an RF output and/or 8 vestigal side band (VSB) suitable as an input signal to a conventional television tuner. This allows the receiver 400 to operate with televisions without a video input.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

In accordance with one or more embodiments of the invention, the receiver 400 has special software in a memory available and executable by the microcontroller 410. The special software enables e-commerce transactions and/or the activation of television programming/pay-TV service. The pay-TV service provider (or vendor) may have the option of recording a customer's 122 credit card information at the time of activation or allowing the customer 122 to input the information directly using the receiver 400.

Figure 5:
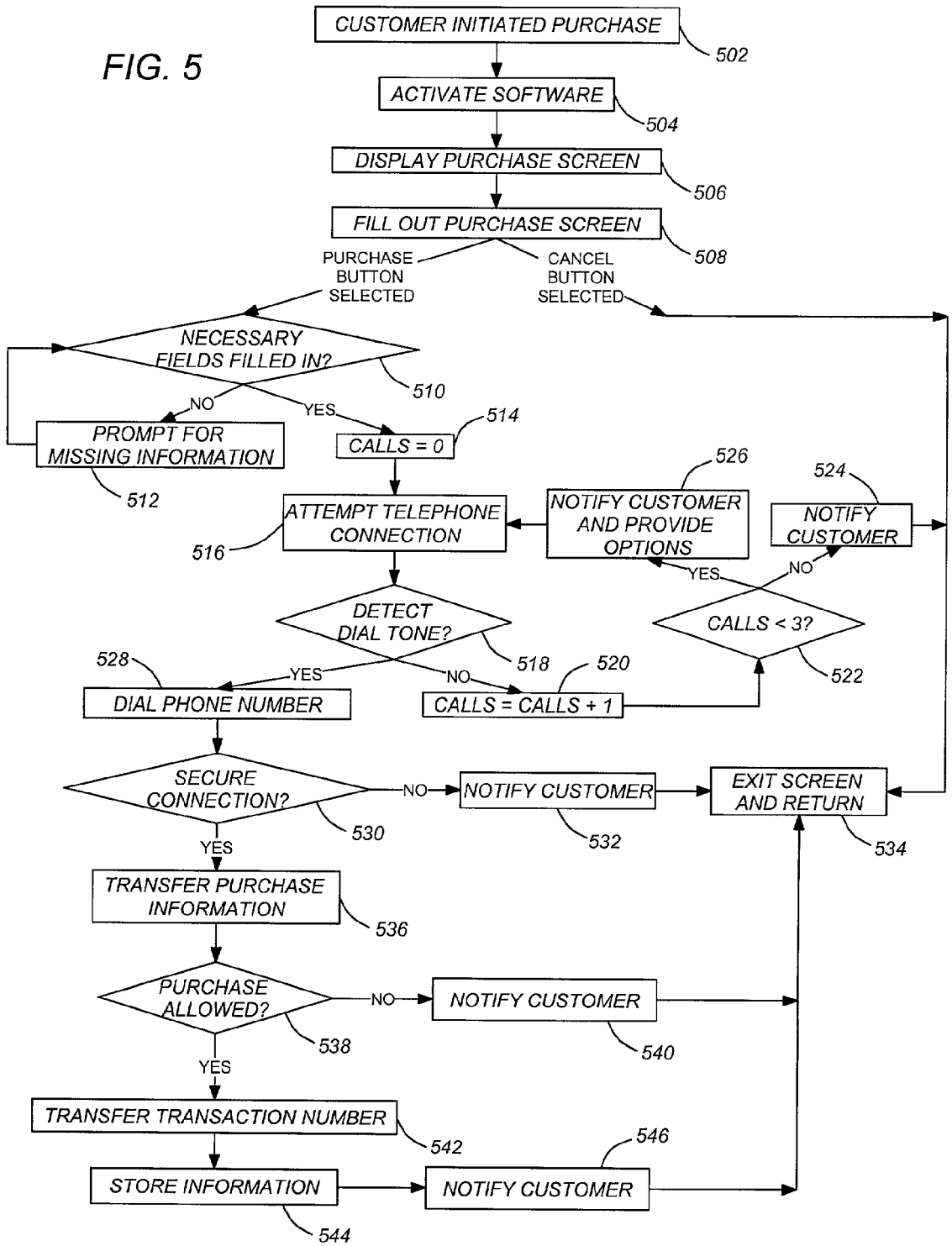
FIG. 5 is a flow chart illustrating the execution of purchasing software in accordance with one or more embodiments of the invention.
Figure 6:
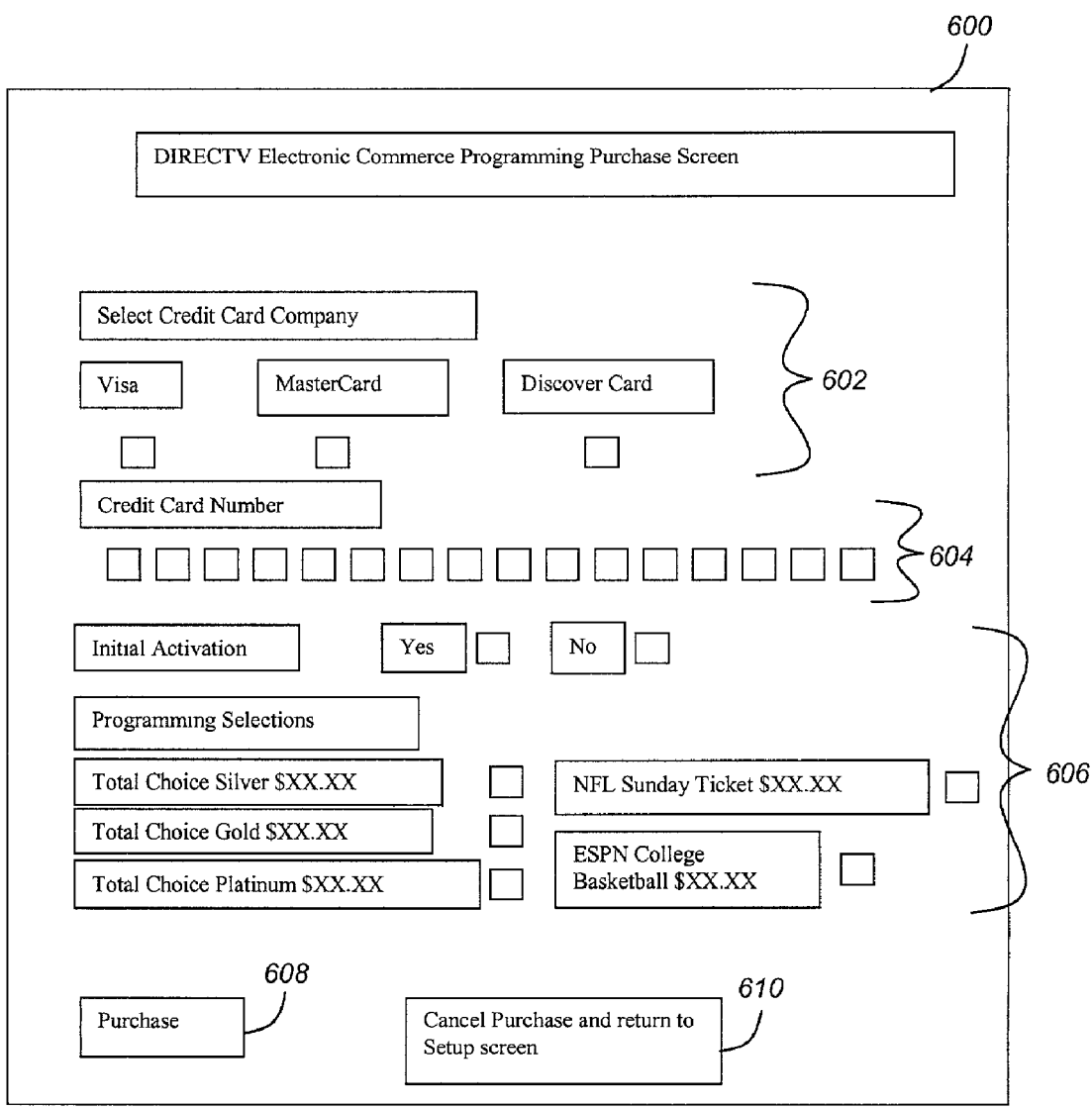
FIG. 6 illustrates a sample purchase screen in accordance with one or more embodiments of the invention.

FIG. 5 is a flow chart illustrating the execution of such software in accordance with one or more embodiments of the invention. Either using the remote control 424, a receiver 400 keyboard interface, and/or another input device, a customer 122 can initiate a purchase at step 502. After initiating a purchase, the software is activated at step 504 which activates/displays a purchase screen on a display/presentation device connected to the receiver 400 at step 506. FIG. 6 illustrates such a sample purchase screen 600.

Using the input device (e.g., remote control 424) at step 508, the customer 122 may input the type of credit card to be used in field 602, a credit card number in field 604, expiration date, and other information that may be required by a credit card company. Additional input fields 606 on the purchase screen 600 allow the customer 122 to specify merchandise or subscription information. For example, one or more lines may be utilized to input the item number of merchandise to be purchased. Additionally, selection boxes for a service(s) to be purchased may be provided. The price and availability of merchandise and service packages may be modified using download techniques that are employed in current generation receivers 400 as described above. Additionally, buttons 608–610 may be provided to confirm or cancel the purchase.

The inputs illustrated in FIG. 6 may be enabled in such a way that a standard receiver remote 424 control could be employed. For example, all of the characters to be entered would be numeric so that the standard number pad would work. Pressing a "select" button or similar type button would be utilized for all other inputs.

Once the purchase screen 600 is completed and the purchase button 608 is selected, the receiver 400 internal software performs a number of functions. First, the software checks to make sure that all relevant information has been filled out in screen 600 at step 510. If not, a message/screen is displayed informing the customer 122 exactly what information is missing and prompts the customer 122 to input the required information at step 512. After the information is properly filled out a message/screen may be displayed informing the customer 122 to review the information and perform a purchase confirmation.

If the purchase is confirmed, the receiver 400 sets the number of calls (i.e., the call counter) equal to zero at step 514 and attempts to obtain a dial tone from the connected phone line using communication mechanism 440 at step 516. A determination is made at step 518 regarding whether or not a dial tone was obtained. If a dial tone cannot be obtained, the call counter is increased by one at step 520, and the software determines if the system has attempted to obtain a dial tone less than three times at step 522. If three or more attempts have been made, the receiver 400 displays a message informing the customer 122 that a dial tone cannot be detected and to please try again later (e.g., "Cannot detect dial tone, please try later") at step 524. If less than three attempts to obtain a dial tone have been made, an on-screen dialog box informs the customer 122 that there is a problem (e.g., "The dial tone cannot be detected") and provides/suggests several possible corrective or courses of action at step 526.

Once a dial tone has been obtained, a phone number is selected from an internal list of phone numbers stored in a memory of receiver 400 and dialed at step 528. Alternatively, if a continuous connection is maintained using communication mechanism 440, the phone number may be obtained across the Internet or other network where the numbers may be stored on a remote server. The phone number may correspond to the credit card company selected in screen 600 from area 602 or to a particular vendor (of merchandise or services). In one or more embodiments, the phone number may correspond to a modem for an Internet Service Provider (ISP) wherein the customer 122 may establish a connection to the Internet and any information transmitted from modem 440 is routed across the Internet for processing.

In one or more embodiments, the communication mechanism 440 may be a digital subscriber line (DSL) or cable modem that enables a continuous connection to the Internet through a selected ISP. Once the phone number is called or a connection with the Internet is established, embodiments of the invention attempt to establish a secure connection with the computer system of the vendor, credit card company, etc. Thus, if an ISP is dialed, once connected to the ISP, the receiver 400 attempts to establish a secure connection with the credit card company or vendor across the internet. For example, such a secure connection may utilize SSTP (secure socket transfer protocol). In another example, if a vendor is dialed, the receiver 400 may attempt to establish a secure connection with the vendor.

A determination is made at step 530 regarding whether a secure connection has been established. If a secure connection cannot be established, the receiver 400 notifies the customer 122 (e.g., by displaying an on-screen message such as "Cannot establish secure connection, please try later") at step 532 and exits the e-commerce screen and returns the user to the setup screen at step 534. If new service activation is being conducted, the secure connection may be established with the television service provider such as DIRECTV. Alternatively, if service or merchandise is being purchased, the secure connection may be established with the vendor of the service or merchandise. Once a secure connection is established, receiver 400 transfers the purchase information through the connection to the receiving computer at step 536. The receiving computer may then process the purchase information to complete the purchase. Such processing may include transmitting, contacting, or communicating with a credit card company to obtain approval of the purchase. In accordance therewith, the vendor may attempt to establish a secure connection with the credit card company specified.

As with all transactions performed with credit cards, a verification is made regarding credit limits, etc., and if the purchase is denied by the credit card company, the customer 122 is notified (e.g., by displaying an on-screen message such as "Purchase cannot be completed, please call your credit card service provider at the following number:") at step 540. If the purchase is allowed, a confirmation number may be generated by the credit card company, vendor, or both. This confirmation number is transmitted to receiver 400 by the vendor or credit card company at step 542. At step 544, receiver 400 stores the confirmation number into a purchase history screen in the receiver 400 to allow the customer 122 to view the items that have been ordered and have all of the necessary information available to them in case a dispute should arise over a particular purchase.

Given the successful completion of a transaction directly with a credit card company, the credit card company may automatically notify the vendor of the billing confirmation number. For example, the credit card company may send a signal to a pay-TV service provider with the billing confirmation number, customer 122 information (name, address, phone number, etc.) and the services that the customer 122 has paid for. The pay-TV service provider may then generate the appropriate service authorizations and transmit them over the air 118 to activate the receiver 400.

During the transaction processing, an on-screen message may inform the customer 122 of the actions being taken by the receiver 400, such as dialing the number at step 528, establishing the secure connection, purchase confirmation at step 542, and displaying a transaction confirmation number if everything has been completed successfully. Receiver 400 may also cause a screen to display a customer 122 service number of the particular credit card company, vendor, pay-TV service provider, etc. in case the transaction is not successfully completed or there is a problem with the services (e.g., pay-TV package) or merchandise selected.

After the transaction is completed, the receiver 400 notifies the customer 122 of the completion at step 546. For example, the receiver 400 may display the following on-screen message if the purchase is an activation or payment for pay-TV service: "Your purchase/activation has been completed. To review your past purchases, please refer to the Purchase History screen. If you have trouble with your activated services, please call 1-800-DIRECTV". Alternatively, if merchandise has been purchased, receiver 400 may display the following message: "Your purchase has been completed and you will receive your items in X weeks. To review your past purchases, please refer to the Purchase History screen. You will now be returned to your last viewed channel". Thereafter, any merchandise purchased may be shipped to the customer 122 and the billing of the item appears on the customer's 122 monthly credit card statement.

The functionality implemented in the receiver 400 depicted in FIG. 5 can be implemented by one or more hardware modules, one or more software modules defining instructions performed by a processor, or a combination of both.

Conclusion

This concludes the description of one or more embodiments of the invention. Utilizing this method, a pay-TV service provider can allow customers 122 to perform a number of transactions ranging from purchasing pay-per-view programming, self-activation of pay-TV service, to purchasing a wide variety of merchandise utilizing a receiver 400, a standard remote control 424, and a credit card. Such capabilities allows the pay-TV service provider to give customers 122 a unique an convenient service and generate a significant amount of additional revenue without incurring and reducing additional costs of the associated billing and customer 122 service calls.

The following describes some alternative embodiments for accomplishing the present invention. For example, any type of computer, such as a mainframe, minicomputer, work station or personal computer, could be used with the present invention. In addition, any program, function, or system providing similar functions as recited herein could be used to implement the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of initializing a subscription television service comprising.
   (a) receiving, from a user, an initiation of a purchase in a receiver connected to a presentation device;
   (b) in response to the receiving, activating software, in the receiver, the software causing the receiver to display, on the presentation device, a purchase screen for selecting one of a plurality of services and having at least one field, wherein the receiver is further configured to:
      (i) receive broadcast signals through an input mechanism; and
      (ii) enable the presentation device: to display the broadest signals;
   (c) receiving, from the user, purchase information for a purchase, in the at least one field into the receiver, wherein the purchase information identifies an initial selection of one of the plurality of an initial television subscription service for an initial activation of the receiver and an initial television programming package for the receiver;
   (d) establishing a secure electronic connection, using a communication mechanism of the receiver that is different from the input mechanism that is used to receive broadcast signals, with a vendor;
   (e) electronically transmitting the purchase information from the receiver through the electronically secure electronic connection to the vendor,
   (f) receiving a confirmation number from the vendor into the receiver, wherein the transmitting the purchase information from the receiver through the confirmation number confirms that the purchase has been allowed by the vendor;
   (g) receiving, in the receiver, authorization for the initial activation of the subscription television service for the initial activation of the receiver and initial television programming package; and
   (h) using the received authorization, activating and configuring the receiver to allow the display of the initial subscription television services.

2. The method of claim 1 wherein the activation of the purchase screen is received from the user using a remote control.

3. The method of claim 1 wherein the purchase information further comprises:
   a type of credit card;
   a credit card number; and
   an expiration date.

4. The method of claim 1, further comprising receiving additional purchase information, wherein the additional purchase information comprises merchandise information for merchandise to be purchased from the vendor.

5. The method of claim 1, further comprising receiving additional purchase information, wherein the additional purchase information comprises service information for a service to be purchased from the vendor.

6. The method of claim 5 further comprising:
   receiving, in the receiver, authorization for the service from the vendor; and
   configuring the receiver to allow the display of the authorized services.

7. The method of claim 1 further comprising verifying that all of the required purchase information has been received.

8. The method of claim 1 wherein establishing a secure electronic connection comprises:
   obtaining a dialtone through a modem connected to the receiver;
   dialing a phone number corresponding to the vendor selected, wherein the phone number is stored in the receiver; and
   establishing a secure connection with a computer system of the vendor at the phone number dialed.

9. The method of claim 1 further comprising causing one or more onscreen messages to be displayed that indicate actions being taken by the receiver.

10. The method of claim 1 further comprising storing the confirmation number into a purchase history screen in the receiver that allows a customer to view the purchase information.

11. The method of claim 1 wherein the vendor is a credit card company.

12. The method of claim 1 wherein the receiver is an integrated receiver/decoder (IRD).

13. The method of claim 1 wherein the presentation device is a television.

14. A system for initializing a subscription television service comprising a receiver having a computer readable medium having embodied thereon instructions for performing the steps to:
   receive broadcast signals through as input mechanism;
   enable a presentation device connected to the receiver to display the broadcast signals;
   receive, from a user, an initiation of a purchase;
   in response to the initiation of the purchase, activate software that causes the receiver to display, on the presentation device, a purchase screen for selecting one of a plurality of services and having at least one field,
   receive, from the user, purchase information for a purchase, in the at least one field, wherein the purchase information identifies from a plurality of TV subscription services an initial television subscription service for an initial activation of the receiver and an initial television programming package for the receiver;
   establish a secure electronic connection, using a communication mechanism that is different from the input mechanism that is used to receive broadcast signals, with a vendor;
   electronically transmit the purchase information through the secure electronic connection to the vendor, receive a confirmation number from the vendor, wherein the confirmation number confirms that the purchase has been allowed by the vendor;

receive authorization for the initial activation of the subscription television service for the initial activation of the receiver and the initial television programming package; and use the received authorization to activate and configure the receiver to allow the display of the initial subscription television services.

15. The system of claim 14 wherein the receiver is configured to receive the activation of the purchase screen from the user using a remote control.

16. The system of claim 14 wherein the purchase information further comprises:
a type of credit card;
a credit card number; and
an expiration date.

17. The system of claim 14 wherein the receiver is configured to receive additional purchase information that comprises merchandise information for merchandise to be purchased from the vendor.

18. The system of claim 14 wherein the receiver is configured to receive additional purchase information that comprises service information for a service to be purchased from the vendor.

19. The system of claim 18, the receiver further configured to:
receive authorization for the service from the vendor; and
allow the display of the authorized services.

20. The system of claim 14, the receiver further configured to verify that all of the required purchase information has been received.

21. The system of claim 14 wherein the receiver is configured to establish a secure electronic connection by:
obtaining a dialtone through a modem connected to the receiver;
dialing a phone number corresponding to the vendor selected, wherein the phone number is stored in the receiver; and
establishing a secure connection with a computer system of the vendor at the phone number dialed.

22. The system of claim 14, the receiver further configured to cause one or more onscreen messages to be displayed that indicate actions being taken by the receiver.

23. The system of claim 14, the receiver further configured to store the confirmation number into a purchase history screen in the receiver that allows a customer to view the purchase information.

24. The system of claim 14 wherein the vendor is a credit card company.

25. The system of claim 14 wherein the receiver is an integrated receiver/decoder (IRD).

26. The system of claim 14 wherein the presentation device is a television.

27. An article of manufacture for initializing a subscription television service comprising:
means for a receiver connected to a presentation device to receive broadcast signals through an input mechanism;
means for the receiver to enable the presentation device to display the broadcast
means for the receiver to receive, from a user, as initiation of a purchase;
means for the receiver, in response to the initiation of the purchase, activate software in the receiver, wherein the software causes the receiver to display, on the presentation device, a purchase screen for selecting one of a plurality of services and having at least one field;

means for the receiver to receive, from the user, purchase information for a purchase in the one or more fields, wherein the purchase information identifies from a plurality of subscription services an initial television subscription service for an initial activation of the receiver and an initial television program package for the receiver;

means for the receiver to establish a secure electronic connection, using a communication mechanism that is different from the input mechanism that is used to receive broadcast signals, with a vendor, means for the receiver to electronically transmit the purchase information through the secure electronic connection to the vendor;

means for the receiver to receive a confirmation number from the vendor, wherein the confirmation number confirms that the purchase has been allowed by the vendor;

means for receiving, in the receiver, authorization for the initial activation of the subscription television service for the initial activation of the receiver and the initial television programming package; and means for using the received authorization to activate and configure the receiver to allow the display of the initial subscription television services.

28. The article of manufacture of claim 27 wherein the activation of the purchase screen is received from the user using a remote control.

29. The article of manufacture of claim 27 wherein the purchase information further comprises:
a type of credit card;
a credit card number; and
an expiration date.

30. The article of manufacture of claim 27, further comprising means for receiving additional purchase information, wherein the additional purchase information comprises merchandise information for merchandise to be purchased from the vendor.

31. The article of manufacture of claim 27, further comprising means for receiving additional purchase information, wherein the additional purchase information comprises service information for a service to be purchased from the vendor.

32. The article of manufacture of claim 31 further comprising:
means for the receiver to receive authorization for the service from the vendor; and
means for the receiver to allow the display of the authorized services.

33. The article of manufacture of claim 27 further comprising means for verifying that all of the required purchase information has been received.

34. The article of manufacture of claim 27 wherein the means for the receiver to establish a secure electronic connection comprises:
means for the receiver to obtain a dialtone through a modem connected to the receiver;
means for the receiver to dial a phone number corresponding to the vendor selected, wherein the phone number is stored in the receiver; and
means for the receiver to establish a secure connection with a computer system of the vendor at the phone number dialed.

35. The article of manufacture of claim 27 further comprising means for the receiver to cause one or more onscreen messages to be displayed that indicate actions being taken by the receiver.

36. The article of manufacture of claim 27 further comprising means for the receiver to store the confirmation number into a purchase history screen in the receiver that allows a customer to view the purchase information.

37. The article of manufacture of claim 27 wherein the vendor is a credit card company.

38. The article of manufacture of claim 27 wherein the receiver is an integrated receiver/decoder (IRD).

39. The article of manufacture of claim 27 wherein the presentation device is a television.

40. The method of claim 1 wherein all of the steps are automated without interacting with personnel from the vendor.

41. The system of claim 14 wherein the receiver is configured to perform the actions automatically without interacting with personnel from the vendor.

42. The article of manufacture of claim 27 wherein all of the means automatically perform the indicated actions without interacting with personnel from the vendor.

* * * * *